United States Patent [19]

Gulick et al.

[11] Patent Number: 5,898,892
[45] Date of Patent: *Apr. 27, 1999

[54] COMPUTER SYSTEM WITH A DATA CACHE FOR PROVIDING REAL-TIME MULTIMEDIA DATA TO A MULTIMEDIA ENGINE

[75] Inventors: Dale E. Gulick; Andy Lambrecht; Mike Webb; Larry Hewitt, all of Austin; Brian Barnes, Round Rock, all of Tex.

[73] Assignee: Advanced Micro Devices, Inc., Sunnyvale, Calif.

[*] Notice: This patent is subject to a terminal disclaimer.

[21] Appl. No.: 08/650,941

[22] Filed: May 17, 1996

[51] Int. Cl.⁶ .................................................... G06F 13/12
[52] U.S. Cl. ............... 395/872; 395/800.35; 395/800.34; 395/281; 711/118; 711/127; 711/146
[58] Field of Search ..................................... 395/800, 474, 395/425, 956, 800.33, 800.34, 800.35, 281, 872; 711/118, 146, 127

[56] References Cited

U.S. PATENT DOCUMENTS

| | | | |
|---|---|---|---|
| 4,245,344 | 1/1981 | Richter | 395/183.19 |
| 4,991,169 | 2/1991 | Davis et al. | 370/463 |
| 5,208,745 | 5/1993 | Quentin et al. | 395/806 |
| 5,245,322 | 9/1993 | Dinwiddie, Jr. et al. | 395/526 |
| 5,261,072 | 11/1993 | Siegel | 395/842 |
| 5,287,484 | 2/1994 | Nishi et al. | 395/425 |
| 5,325,423 | 6/1994 | Lewis | 348/12 |
| 5,373,493 | 12/1994 | Iizuka | 369/124 |
| 5,375,220 | 12/1994 | Ishikawa | 395/425 |
| 5,404,522 | 4/1995 | Carmon et al. | 395/677 |
| 5,440,336 | 8/1995 | Buhro et al. | 348/13 |
| 5,440,740 | 8/1995 | Chen et al. | 395/674 |
| 5,440,755 | 8/1995 | Harwer et al. | 395/281 |

(List continued on next page.)

FOREIGN PATENT DOCUMENTS

| | | |
|---|---|---|
| 0 537 932 A3 | 5/1992 | European Pat. Off. . |
| 0 572 024 A2 | 5/1993 | European Pat. Off. . |
| 0 629 954 A1 | 6/1993 | European Pat. Off. . |
| 0 629 956 A2 | 5/1994 | European Pat. Off. . |
| 94 10641 | 5/1994 | WIPO . |
| 94/10641 | 5/1994 | WIPO . |

OTHER PUBLICATIONS

Horning et al., "Hewlett–Packard's New Multimedia Enabled PA–RISC Workstations," pp. 362–368, IEEE Computer Society Press, Feb. 1994.

(List continued on next page.)

Primary Examiner—Thomas C. Lee
Assistant Examiner—Douglas Rupert
Attorney, Agent, or Firm—Conley Rose & Tayon; Jeffrey C. Hood

[57] ABSTRACT

A computer system and method optimized for real-time multimedia applications are presented. The computer system, including a dedicated multimedia engine coupled directly to a real-time data cache, provides increased performance over current computer architectures. The multimedia engine includes at least one DSP engines which couple through at least one I/O channels to I/O ports. Obtaining multimedia commands and data from main memory and/or the real-time data cache, the multimedia engine performs a number of multimedia operations including audio and video functions. A CPU, coupled through a chip set logic or bridge logic to the main memory, generates multimedia commands and data. The CPU groups multimedia commands and data into separate command and data elements, and writes the command and data elements to a multimedia address space in main memory. The CPU also writes element structure information to the multimedia address space. The element structure information includes location information used to retrieve multimedia commands and data from main memory. The real-time data cache allows multimedia data from an external source to be stored in a location other than main memory, and allows this multimedia data to be shared by the CPU and the multimedia engine. The real-time data cache may also store multimedia commands and data for use by the multimedia engine.

19 Claims, 7 Drawing Sheets

U.S. PATENT DOCUMENTS

| | | |
|---|---|---|
| 5,448,735 | 9/1995 | Anderson et al. ............... 395/685 |
| 5,450,551 | 9/1995 | Amini et al. .................... 395/299 |
| 5,461,679 | 10/1995 | Normile et al. ................. 395/502 |
| 5,487,167 | 1/1996 | Dinallo et al. .................. 395/807 |
| 5,497,373 | 3/1996 | Hulen et al. .................... 395/806 |
| 5,508,940 | 4/1996 | Rossmere et al. ............... 395/328 |
| 5,519,345 | 5/1996 | Farrell et al. ................... 327/108 |
| 5,519,839 | 5/1996 | Culley et al. ................... 395/310 |
| 5,530,835 | 6/1996 | Vashi et al. ..................... 395/474 |
| 5,530,902 | 6/1996 | McRoberts et al. ............. 395/848 |
| 5,535,339 | 7/1996 | Kim ................................ 395/280 |
| 5,551,009 | 8/1996 | Amini et al. .................... 395/492 |
| 5,557,757 | 9/1996 | Gephardt et al. ................ 395/306 |
| 5,564,001 | 10/1996 | Lewis ............................. 395/806 |
| 5,574,662 | 11/1996 | Windrem et al. ................ 364/514 |
| 5,623,633 | 4/1997 | Zeller et al. .................... 395/473 |
| 5,692,211 | 11/1997 | Gulick et al. ................... 395/800 |
| 5,732,224 | 3/1998 | Gulick et al. ................... 395/280 |
| 5,748,983 | 5/1998 | Gulick et al. ................... 395/842 |

OTHER PUBLICATIONS

Kettler, Kevin A. and Jay K. Strosnider, "Scheduling Analysis of the MicroChannel Architecture for Multimedia Applications," Department of Electrical and Computer Engineering, Carnegie Mellon University, Pittsburgh, PA, May 1994, pp. 403–414.

Weiss, Ray, Senior Editor, "DSP tools: navigating the hardware/software interface," *Computer Design*, Oct. 1994, pp. 69–88.

Lee, et al., "Real–time MPEG Video Codec on a Single–chip Multiprocessor," SPIE vol. 2187, Apr. 1994, pp. 32–42.

Horning, et al., "Hewlett–Packard's New Multimedia Enabled PA–RISC Workstations," Feb. 28, 1994, pp. 362–368.

Bursky, D., "Advanced CPUS, Multimedia ICS Deliver Top Throughputs," vol. 44, No. 4, Feb. 19, 1996, pp. 55, 56, 58, 62, 64–66, 68, 70 & 74.

Norrod, F. et al., "A Multimedia–Enhanced X86 Processor," 1996 IEEE International Solid–State Circuits Conference, Digest of Technical Papers, ISSCC, First Edition (Cat. No. 96CH35889), 1996 IEEE International Solid–State Circuits Conference, Digest of Technical Papers, ISSCC, San Francisco, CA USA, 8–10 FE, ISBN 0–7803–3136–2, pp. 220–221 & 449.

Halfhill, T.R., "AMD K6 Takes on Intel P6," Byte, vol. 21, No. 1, Jan. 1, 1996, pp. 67, 68, 70 & 72.

International Search Report for PCT/US 97/01068 mailed Jun. 17, 1997.

PCI Local Bus—*PCI Multimedia Design Guide*—Revision 1.0—Mar. 29, 1994, 41 pages.

COMPUTER SYSTEM WITH A DATA CACHE FOR PROVIDING REAL-TIME MULTIMEDIA DATA TO A MULTIMEDIA ENGINE

FIELD OF THE INVENTION

The present invention relates to a computer system having a dedicated multimedia engine and a real-time data cache local to the multimedia engine.

DESCRIPTION OF THE RELATED ART

Computer architectures generally include a plurality of devices interconnected by one or more various buses. For example, modern computer systems typically include a central processing unit (CPU) coupled through bridge logic to main memory. The bridge logic also typically couples to a high bandwidth local expansion bus, such as the peripheral component interconnect (PCI) bus or the Video Electronics Standards Association (VESA) VL bus. Examples of devices which can be coupled to local expansion buses include video accelerator cards, audio cards, telephony cards, small computer system interface (SCSI) adapters, network interface cards, etc. A second expansion bus may be coupled to the local expansion bus for backwards compatibility. Examples of these expansion buses include the industry standard architecture (ISA) bus, the extended industry standard architecture (EISA) bus, and the Micro Channel architecture (MCA) bus. Various devices may be coupled to the second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system.

In many cases, multimedia hardware cards situated on an expansion bus do not have the required access to system memory and other system resources for proper operation. For example, a multimedia hardware card situated on the local expansion bus must first arbitrate for control of the local expansion bus before the device can access system memory. In addition, since the computer system architecture is not optimized for multimedia, multimedia hardware cards generally do not make efficient use of system resources. As an example, multimedia hardware cards typically include their own memory in addition to system memory. For example, video accelerator cards are typically configured with one to four megabytes of video RAM. Audio cards, video capture cards, and other multimedia cards are also generally configured with dedicated on-board memory. This requirement of additional memory adds undesirable cost to the system.

As multimedia applications become more prevalent, multimedia hardware will correspondingly become essential components in personal computer systems. Therefore, an improved computer system architecture is desired which is optimized for real-time multimedia applications as well as for non-real-time applications. In addition, improved methods are desired for transferring real-time data to multimedia hardware.

SUMMARY OF THE INVENTION

The present invention includes a computer system and method optimized for real-time multimedia applications. The computer system includes a dedicated multimedia engine coupled to a real-time data cache, wherein the multimedia engine and the real-time data cache provide increased performance over current computer architectures. The multimedia engine performs a number of real-time operations including audio and video functions. The multimedia engine obtains commands and data from the main memory and/or the real-time data cache. The multimedia engine may include a multimedia memory and memory controller, and possibly a DMA controller, for even greater performance.

The computer system includes a CPU coupled through a chip set logic to the main memory. The chip set logic includes a main memory controller as well as other support logic. A multimedia engine is coupled through a real-time data cache to the chip set logic. The multimedia engine also optionally couples directly to the main memory. The multimedia engine includes ports for coupling to one or more of a video monitor, audio digital-to-analog converter (DAC), and/or communications device. The chip set logic also couples to a local expansion bus (preferably the PCI bus). Various peripheral devices may be connected to the local expansion bus, including a hard drive, network interface card, communications logic, etc.

The real-time data cache, coupled between the multimedia engine and the chip set logic, allows multimedia commands and data to be stored in a location other than the main memory. In one embodiment, the multimedia engine is coupled directly to the main memory, and the real-time data cache allows stored multimedia data to be shared by the CPU and the multimedia engine. As defined herein, the term "multimedia" refers to video, audio, graphical, and communications information, as well as other types of real-time information. The source of the multimedia data stored in the real-time data cache may be a device connected to an expansion bus. In another embodiment, the multimedia engine is not coupled directly to main memory, and the real-time data cache stores multimedia commands and data obtained from main memory for use by the multimedia engine. In this case, the source of the multimedia information (i.e., commands and data) may be a device connected to an expansion bus, the CPU, or the main memory. The real-time data cache reduces the time required for the multimedia engine to access needed multimedia data, and also reduces loading on the main memory.

The multimedia engine includes one or more DSP engines which may be general purpose DSP engines or dedicated audio and video engines. The one or more DSP engines couple through one or more I/O channels to respective I/O ports, including video, audio and communication ports.

Video I/O ports are adapted for coupling to a video monitor, and audio I/O ports are adapted for coupling to an audio DAC and/or speakers.

According to the present invention, the CPU generates and/or transfers multimedia commands and data to a designated multimedia address space in main memory. The CPU groups multimedia commands and data into separate multimedia command and data elements. The CPU then writes the multimedia command and data elements, along with element location information, to memory locations within the multimedia address space. The element location information includes the address offsets of the elements within the multimedia address space. The multimedia engine uses the element location information to retrieve multimedia commands and data from main memory.

Therefore, the present invention comprises a novel computer system architecture and method which increases the performance of real-time multimedia applications. A dedicated multimedia engine is coupled to the main memory and to a real-time data cache. The real-time data cache may contain data generated by a device connected to an expansion bus. The CPU may access data in the real-time data cache as it generates multimedia commands and data. The CPU writes multimedia commands and data, as well as element location information, to the main memory. The multimedia engine obtains multimedia commands and data from the main memory and/or the real-time data cache as needed, preferably concurrently with multimedia engine operations.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Incorporation by Reference

PCI System Architecture by Tom Shanley and Don Anderson and available from Mindshare Press, 2202 Buttercup Dr., Richardson, Tex. 75082 (214) 231–2216, is hereby incorporated by reference in its entirety.

The Intel Peripherals Handbook, 1994 and 1995 editions, available from Intel Corporation, are hereby incorporated by reference in their entirety.

The PCI Multimedia Design Guide, 1994 edition, available from Intel Corporation, is hereby incorporated by reference in its entirety.

Data sheets on the Intel 82430FX PCIset chip set, also referred to as the Triton chip set, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

Computer System Block Diagram

Figure 1:
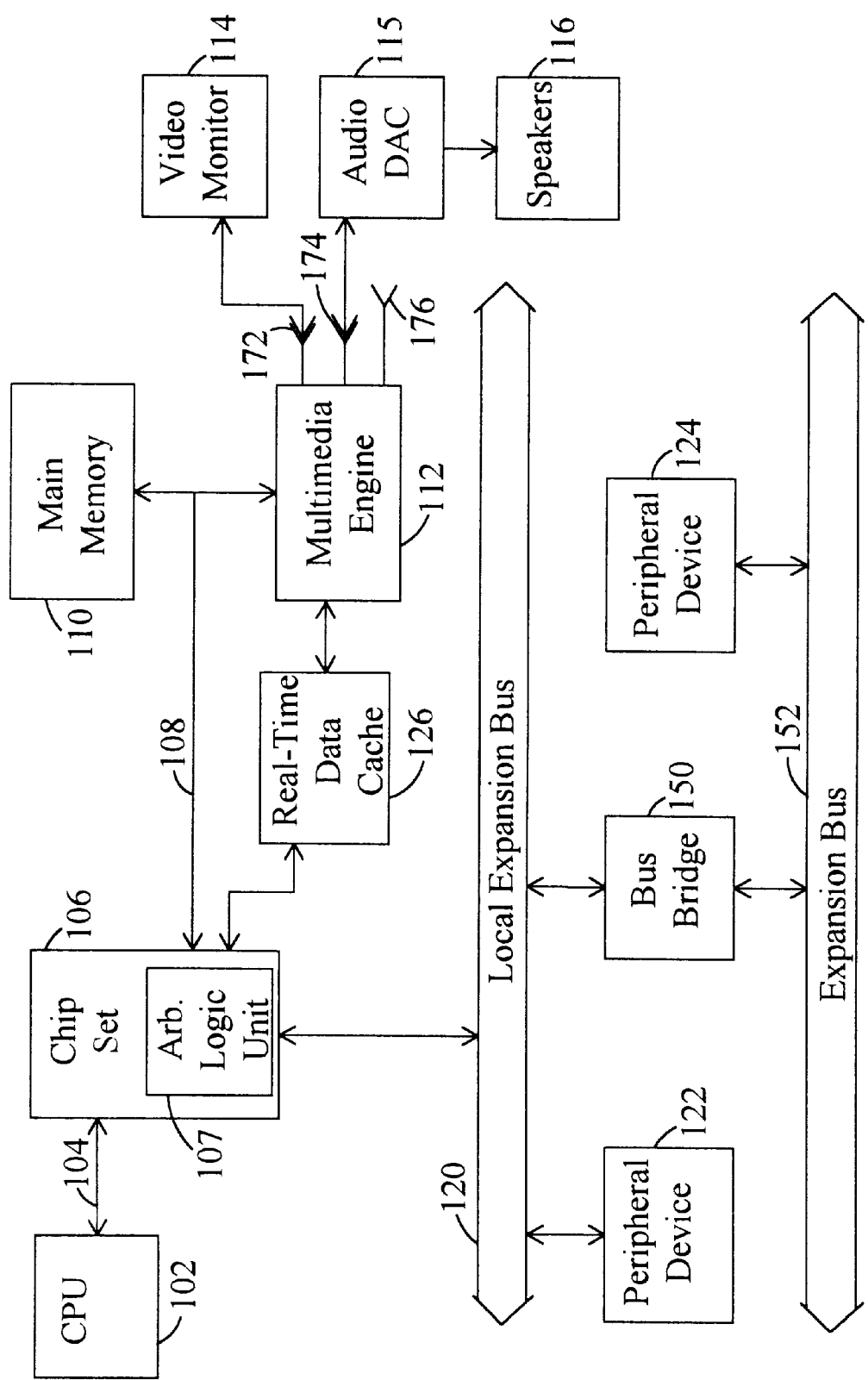
FIG. 1 is a block diagram of one embodiment of a computer system including a multimedia engine coupled to a main memory and to a real-time data cache.

Referring now to FIG. 1, a block diagram of one embodiment of a computer system according to the present invention is shown. The computer system includes a central processing unit (CPU) 102 coupled through a processor bus 104 to a chip set 106 (i.e., a host/PCI/cache bridge). Chip set 106 is preferably similar to the Triton chip set available from Intel Corporation, including certain modifications to accommodate the multimedia engine and real-time data cache of the present invention. A second level or L2 cache memory (not shown) may be coupled to a cache controller within chip set 106. Chip set 106 couples through a memory bus 108 to a main memory 110. The chipset 106 also couples through a real-time data cache 126 to a multimedia engine 112. An arbitration logic unit 107 within chip set 106 performs arbitration between CPU 102 and multimedia engine 112 for access to main memory 110. Main memory 110 is preferably dynamic random access memory (DRAM) or extended data out (EDO) memory.

Multimedia engine 112 is coupled to memory bus 108 and to real-time data cache 126. Multimedia engine 112 is configured to perform video and audio processing functions and to provide multimedia output signals to one or more input/output ports. As shown, multimedia engine 112 preferably includes an input/output port 172 adapted for coupling to a video monitor 114, and an input/output port 174 adapted for coupling to an audio coder-decoder (CODEC), including an audio DAC 115. Audio DAC 115 may include a suitable D/A converter available from Crystal Semiconductor of Austin, Tex. Audio DAC 115 is coupled to speakers 116. Multimedia engine 112 may also include an input/output port 176 adapted for coupling to a communications media.

In a preferred embodiment, multimedia engine 112 includes video processing circuitry and/or firmware, including a random access memory digital to analog converter (RAMDAC) for converting video data into appropriate analog signals, preferably red, green and blue (RGB) signals, for output directly to video monitor 114. In an alternate embodiment, the multimedia engine includes DSP engine 210 provides digital video pixel data through I/O channel 220A to video input/output port 172, and a separate RAMDAC and associated logic circuitry (not shown) receives the video pixel data from video input/output port 172 and generates the appropriate RGB signals to drive video monitor 114.

Chip set 106 is also coupled to local expansion bus 120. Local expansion bus 120 is preferably a PCI bus. However, it is noted that local expansion bus 120 may be any of a number of local bus architectures, including the VESA VL bus. Various types of peripheral devices may be connected to local expansion bus 120. In FIG. 1, a peripheral device 122 is coupled to local expansion bus 120. Peripheral device 122 may be a hard disk, a CD-ROM interface card, a network interface controller, a SCSI adapter, or other common peripheral device. A bus bridge 150 optionally couples local expansion bus 120 to a second expansion bus 152. Expansion bus 152 may be any of varying types, including an ISA bus, an EISA bus, or an MCA bus. In FIG. 1, a peripheral device 124 is shown coupled to expansion bus 152. Peripheral device 124 may be a modem or other legacy peripheral device. Chip set 106 receives multimedia data from an external device, coupled to local expansion bus 120 or expansion bus 152, and stores the multimedia data in real-time data cache 126. For example, the source of the multimedia data stored in real-time data cache 126 may be a video decoder, a video capture device, a CD ROM, or other peripheral device connected to local expansion bus 120.

Real-time data cache 126, coupled between multimedia engine 112 and chip set 106, allows multimedia data from an external source to be stored in a location other than main memory 110. Real-time data cache 126 also allows this multimedia data to be shared by CPU 102 and multimedia engine 112. Multimedia data stored in the real-time data cache 126 is accessible to the multimedia engine 112 with reduced latency, and real-time data cache 126 also reduces the loading on main memory 110.

Arbitration Logic

Arbitration logic unit 107 within chip set 106 (FIG. 1) receives bus requests from CPU 102 and multimedia engine 112 and grants access to main memory 110 via memory bus 108. Multimedia engine 112 preferably has priority access to multimedia address space 182 in main memory 110. In order to gain access to multimedia address space 182, multimedia engine 112 may simply write one or more bits to a register in arbitration logic unit 107. In this case, CPU 102 is only granted access to multimedia address space 182 after being denied access for a certain amount of time. Alternatively, memory bus 108 is an isochronous bus wherein CPU 102 and multimedia engine 112 have guaranteed bandwidth and latency on memory bus 108 to main memory 110. An alternative arbitration scheme, such as a round robin or priority based scheme, may also be used.

Main memory 110 stores the operating system and applications software as well as driver software, including video drivers and audio drivers. Main memory 110 and/or peripheral device 122 also store multimedia commands and data. CPU 102 executes applications software and driver software from main memory 110 and generates and/or transfers multimedia commands and data. For example, the CPU 102 may cause the transfer of multimedia data from a peripheral device or an external source to the main memory 110 or to the real-time data cache 126. The CPU 102 may also generate multimedia commands and data in response to applications software.

Main Memory Block Diagram

Figure 2A:
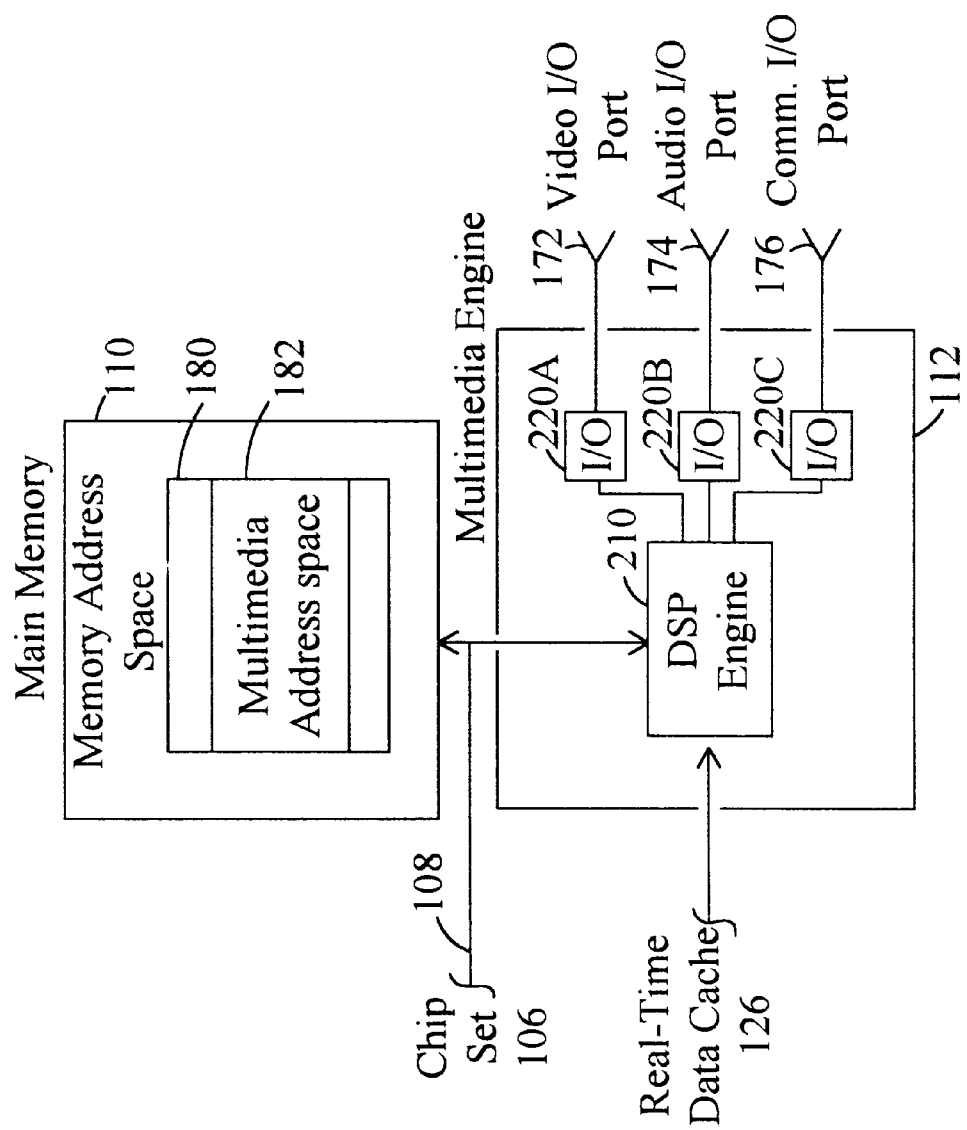
FIG. 2a is a block diagram of the main memory and one embodiment of the multimedia engine.

FIG. 2a is a block diagram illustrating multimedia engine 172 coupled to main memory 110. In the embodiment of FIG. 2a, memory used to store multimedia commands and data is external to multimedia engine 112. Multimedia engine 112 includes one or more DSP engines 210. Each DSP engine 210 is coupled to memory bus 108, real-time data cache 126, and one or more I/O channels 220. As shown, multimedia engine 112 includes three I/O channels 220A, 220B, and 220C. I/O channel 220A is preferably a dedicated video channel and couples to video input/output port 172. I/0 channel 220B is preferably a dedicated audio channel and couples to audio input/output port 174. I/O channel 220C couples to communication input/output port 176. In another embodiment, each of DSP engine 210 may be dedicated to a specific multimedia function (e.g., video, audio, or communications).

During computer system initialization, a portion of memory address space 180 in main memory 110 is allocated to multimedia engine 112, this being referred to as multimedia address space 182. In one embodiment, multimedia engine 112 may request additional address space if assigned multimedia address space 182 in main memory 110 is inadequate. The operation of main memory 110 in this manner has the advantage that multimedia engine 112 uses only the amount of memory needed. Memory not allocated to the multimedia engine 112 is available for other applications.

During operation of multimedia engine 112, CPU 102 transfers and/or generates multimedia commands and data, forms separate multimedia command and data elements, and writes the multimedia command and data elements to multimedia address space 182 in main memory 110. The multimedia command element includes multimedia commands, and the multimedia data element includes multimedia data. As the CPU generates or transfers multimedia commands and data, CPU 102 may access real-time data cache 126 containing multimedia data generated by an external source (i.e., a peripheral device connected to expansion bus 120 or 152). CPU 102 may perform multimedia-related operations (e.g., image scaling or rotation) upon the multimedia data from real-time data cache 126, generating additional multimedia data. CPU 102 writes multimedia command and data elements to multimedia address space 182, along with element structure information. Element structure information includes the address offsets of the first memory locations of the multimedia command and data elements within multimedia address space 182. CPU 102 writes element structure information to memory locations at predetermined address offsets relative to the first memory location of the multimedia address space (i.e., the base address of the multimedia address space). Using the base address of the multimedia address space and element address offset information, multimedia engine 112 retrieves multimedia commands and data from main memory.

Multimedia Engine Block Diagram

During operation of multimedia engine 112, each DSP engine 210 obtains multimedia commands from main memory 110 and data from main memory 110 and/or real-time data cache 126 as needed. Each DSP engine 210 executes multimedia commands, generates multimedia output signals, and directs multimedia output signals to an appropriate output port via an appropriate I/O channel. In one embodiment, video and audio I/O channels 220A and 220B are synchronized with each other to ensure synchronized audio and video during multimedia presentations. Multimedia engine 112 may execute commands in the order retrieved, or multimedia engine 112 may prioritize multimedia commands. For example, commands associated with video and audio components of a multimedia presentation may require a higher execution priority than commands associated with a telephony application.

In a preferred embodiment, one of the one or more DSP engines 210 is configured to perform video and graphics functions (e.g., polygon rendering and texture mapping) and audio functions (e.g., MIDI and wavetable synthesis). Such a DSP engine may include one or more ROMs which store microcode corresponding to video and audio processing instructions or commands. The DSP engine 210 may also perform communication functions, such as ISDN connectivity or modem functionality.

Figure 2B:
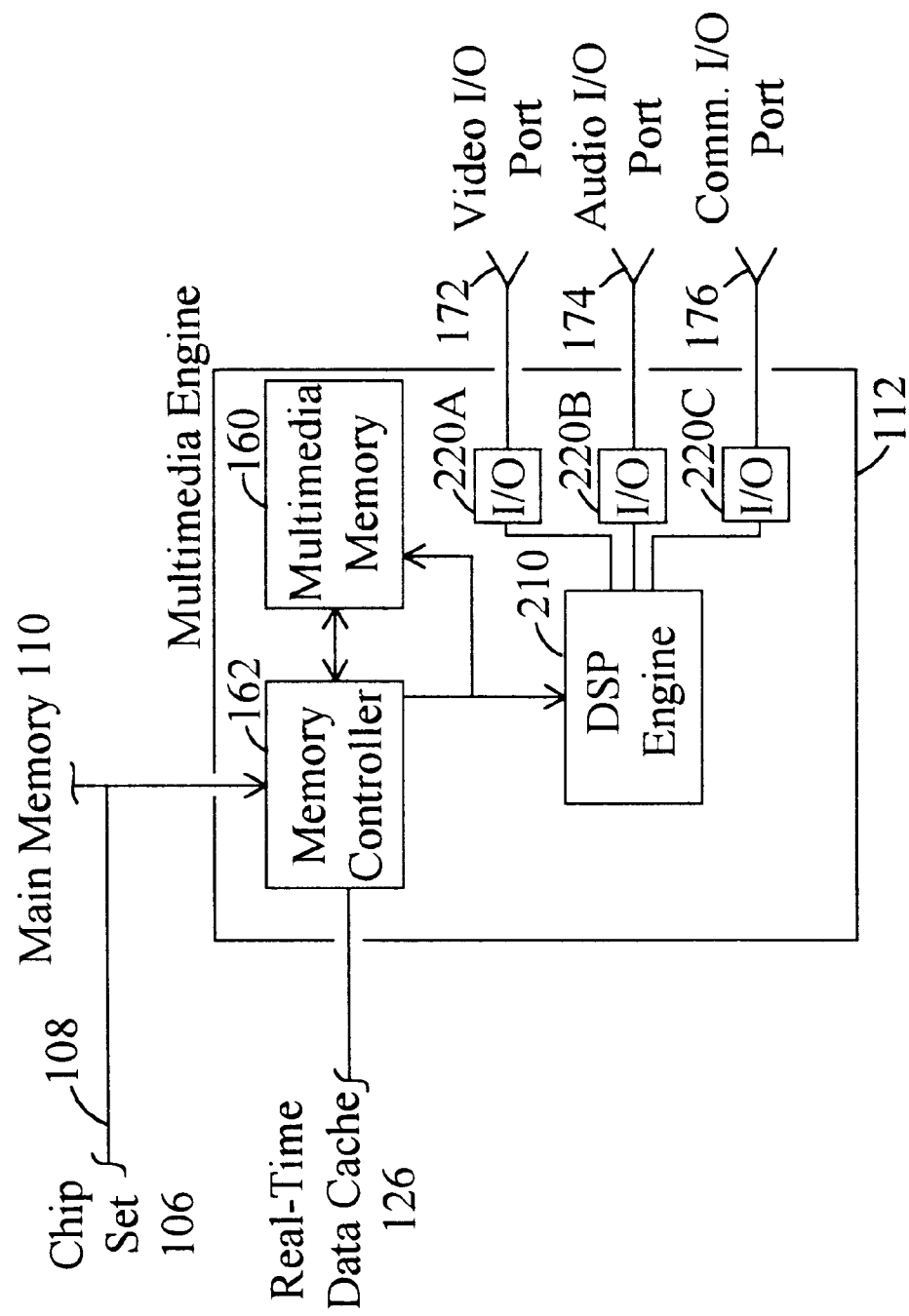
FIG. 2b is a block diagram of a second embodiment of the multimedia engine including an on-chip multimedia memory and memory controller.

FIG. 2b—Alternate Multimedia Engine Embodiment

FIG. 2b is a block diagram of multimedia engine 112 according to a second embodiment. The multimedia engine 112 includes a memory controller 162 coupled to memory bus 108, real-time data cache 126, and a multimedia memory 160. Each DSP engine 210 is coupled to one or more I/O channels 220 as described above. Memory controller 162 controls the operation of, and acquires multimedia commands and data for, multimedia memory 160. Memory controller 162 obtains multimedia commands from the multimedia command element in multimedia address space 182 of main memory 110. Memory controller 162 obtains multimedia data from the multimedia data element in multimedia address space 182 and/or real-time data cache 126.

Multimedia memory 160 may include a data cache containing multimedia data expected to be needed again in the near future. Multimedia memory 160 may also include a multimedia command queue, and memory controller 162 may include a prefetch mechanism to keep the multimedia command queue filled. In addition, multimedia memory 160 may be partitioned into two or more separate address spaces or buffers, one address space or buffer for each DSP engine 210. Each DSP engine 210 may thus access commands and data from an associated address space or buffer.

In the embodiment of FIG. 2b, multimedia memory 160 is dual ported memory. A first port of multimedia memory 160 couples to memory controller 162, and a second port of multimedia memory 160 couples to the one or more DSP engine 210. Multimedia memory 160 preferably comprises high speed dual ported dynamic random access memory (DRAM), and memory controller 162 preferably includes a dual ported DRAM memory controller.

During operation of multimedia engine 112, each DSP engine 210 obtains multimedia commands and data from multimedia memory 160. Each DSP engine 210 executes multimedia commands, generates multimedia output signals, and provides multimedia output signals to an appropriate output port via an appropriate I/O channel as described above.

Figure 2C:
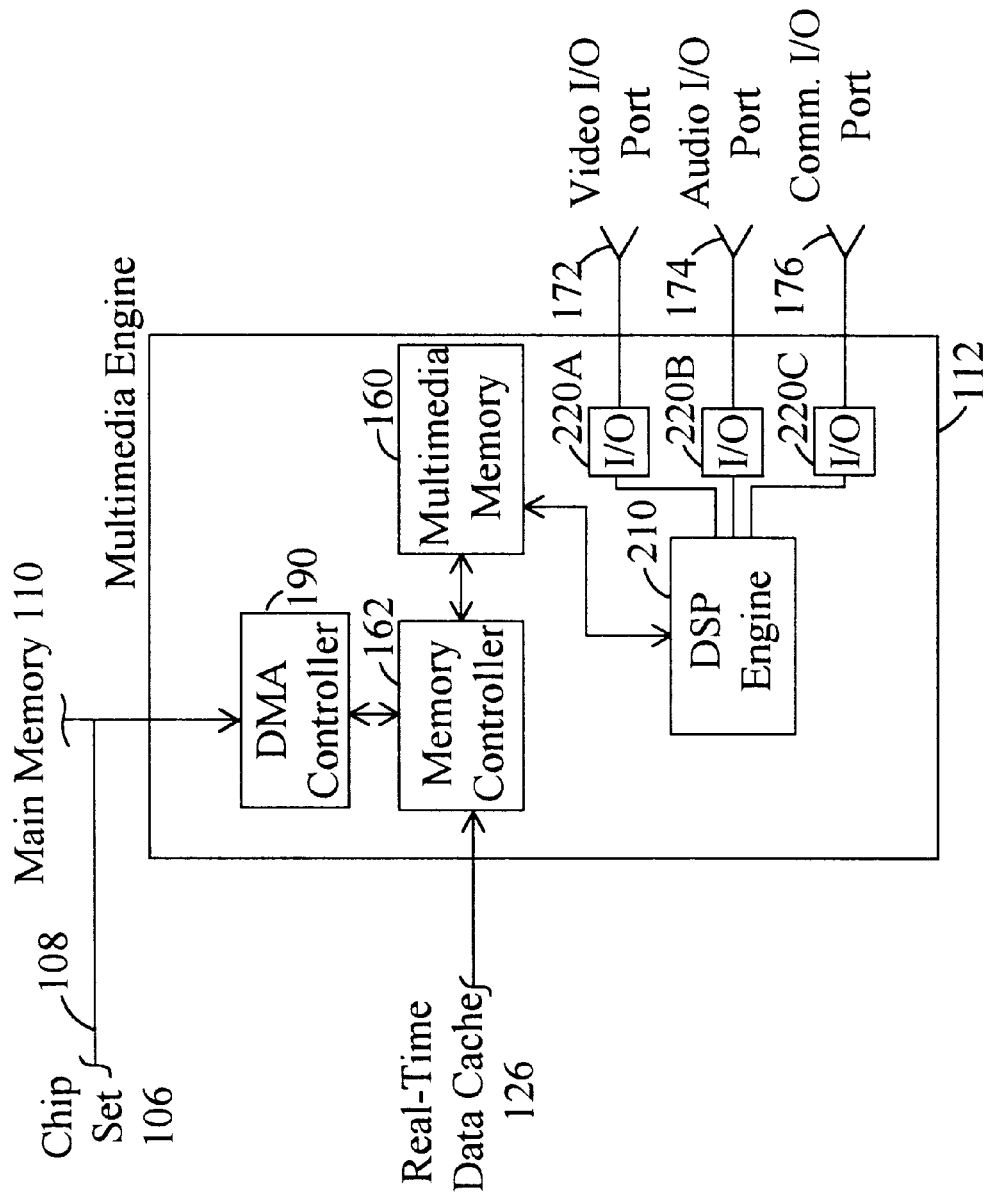
FIG. 2c is a block diagram of a third embodiment of the multimedia engine including an on-chip multimedia memory, a memory controller, and a DMA controller.

FIG. 2c—Alternate Multimedia Engine Embodiment

FIG. 2c is a block diagram of multimedia engine 112 illustrating a third embodiment. A direct memory access (DMA) controller 190 is coupled between memory controller 162 and memory bus 108. Memory controller 162 obtains multimedia commands and data stored in main memory 110 via DMA controller 190. DMA controller 190 transfers large numbers of multimedia commands and data stored in sequential memory locations (i.e., blocks of multimedia commands and data) located within multimedia address space 182 of main memory 110. Transfers of a smaller number of larger blocks of commands and data may be performed more efficiently than transfers of a larger number of smaller blocks. Memory controller 162 may also obtain multimedia data from real-time data cache 126. Multimedia memory 160 is configured as described above, and each DSP engine 210 operates as described above.

Figure 3:
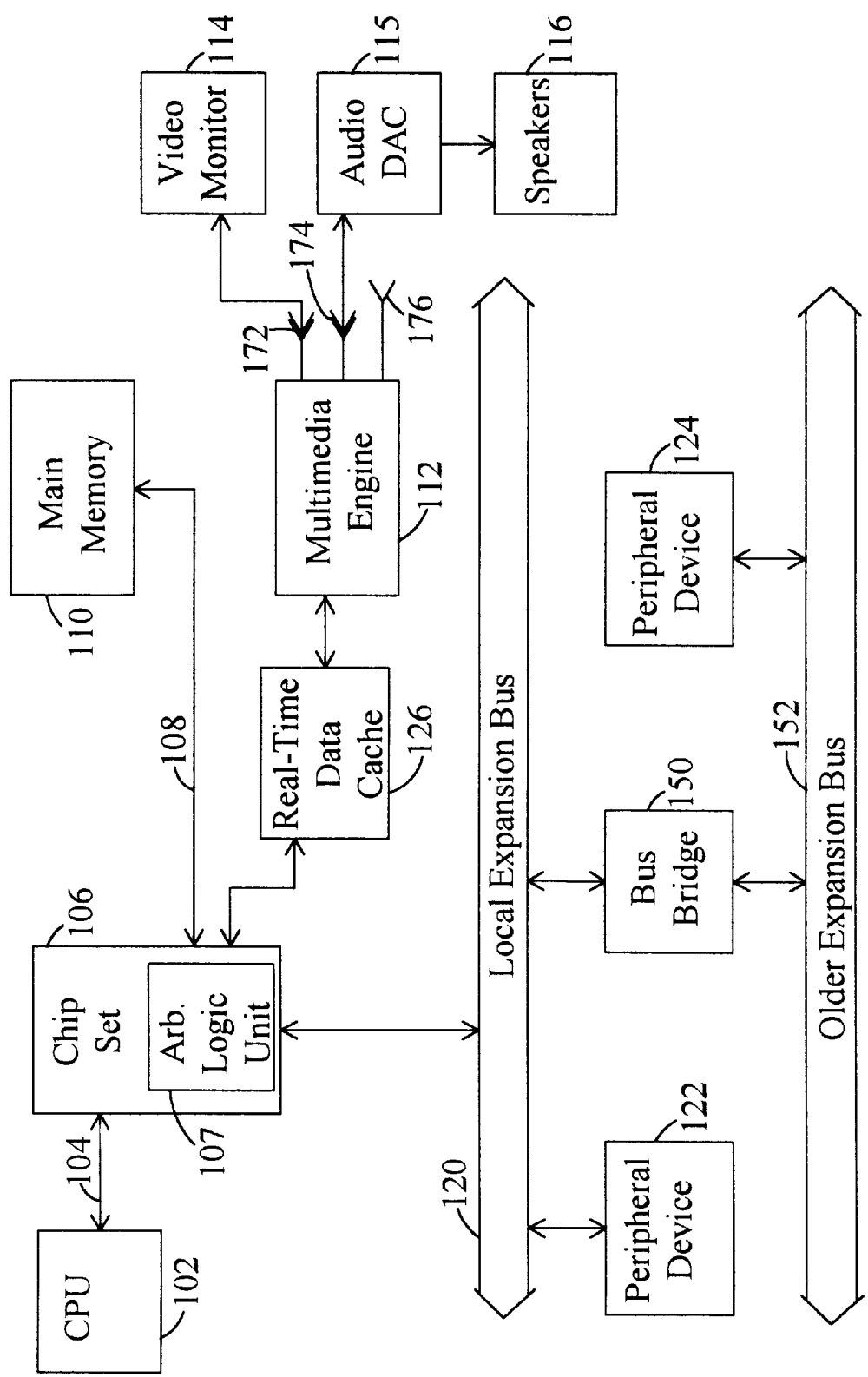
FIG. 3 is a block diagram of a second embodiment of a computer system including a multimedia engine coupled to a real-time data cache.
Figure 4:
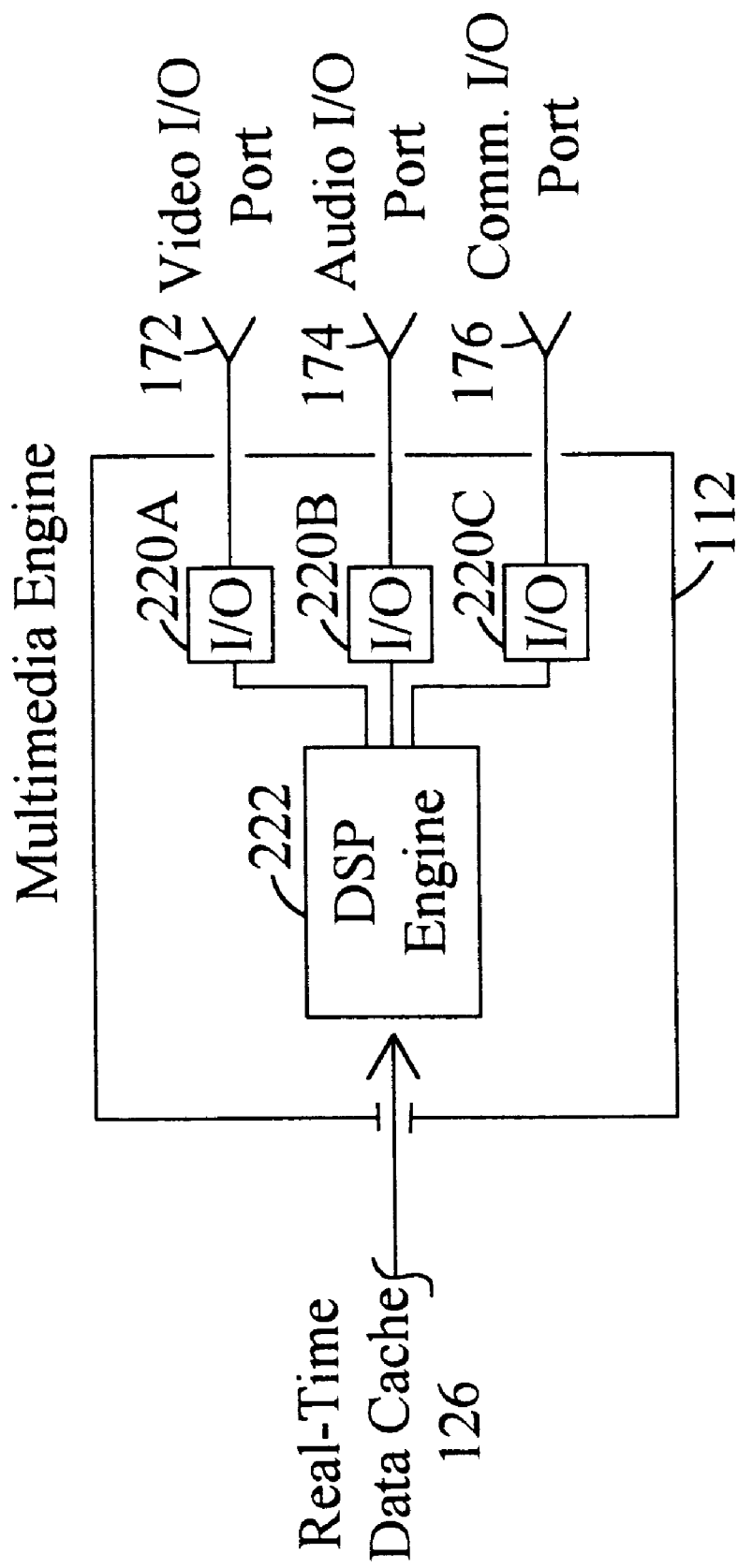
FIG. 4 is a block diagram of an embodiment of the multimedia engine in the computer system of FIG. 3.

FIGS. 3 and 4—Alternate Computer System Embodiment

FIGS. 3 and 4 illustrate a second embodiment of a computer system including multimedia engine 112 coupled directly to real-time data cache 126, but not coupled directly to main memory 110. FIG. 3 is a block diagram of a computer system of the second embodiment. Multimedia engine 112 is coupled to a video input/output port 172, an audio input/output port 174, and a communications input/output port 176. A real-time data cache 126 is coupled between multimedia engine 112 and chip set 106. Real-time data cache 126 allows multimedia data from an external source to be stored in a location other than main memory 110, and also allows this multimedia data to be shared by CPU 102 and multimedia engine 112. In this embodiment, real-time data cache 126 also contains multimedia commands and data obtained from main memory 110. Multimedia engine 112 obtains multimedia commands and data from real-time data cache 126 when needed. If the required information is not present in real-time data cache 126 (i.e., a cache miss occurs), real-time data cache 126 obtains the information from main memory 110 through chip set 106. All other computer system components shown in FIG. 3 function as described above.

FIG. 4 is a block diagram of one embodiment of multimedia engine 112 in the computer system of FIG. 3. Memory used to store multimedia commands and data is external to multimedia engine 112. Multimedia engine 112 includes one or more DSP engine 222. Each DSP engine 222 is coupled to real-time data cache 126, and to one or more I/O channels 220. As shown, multimedia engine 112 includes three I/O channels 220A, 220B, and 220C as described above. During operation of multimedia engine 112, each DSP engine 222 obtains multimedia commands and data from real-time data cache 126 as needed. Each DSP engine 222 executes multimedia commands, generates multimedia output signals, and directs multimedia output signals to an appropriate output port via an appropriate I/O channel. Multimedia engine 112 may execute commands in the order retrieved, or multimedia engine 112 may prioritize multimedia commands. Commands associated with video and audio components of a multimedia presentation may require a higher execution priority than commands associated with a telephony application. In a preferred embodiment, one of the one or more DSP engine 222 is configured to perform video and graphics functions (e.g., polygon rendering and texture mapping) and audio functions (e.g., MIDI and wavetable synthesis). Such a DSP engine may include one or more ROMs which store microcode corresponding to video and audio processing instructions or commands. The DSP engine may also perform communication functions, such as ISDN connectivity or modem functionality.

Computer System Operation

Figure 5:
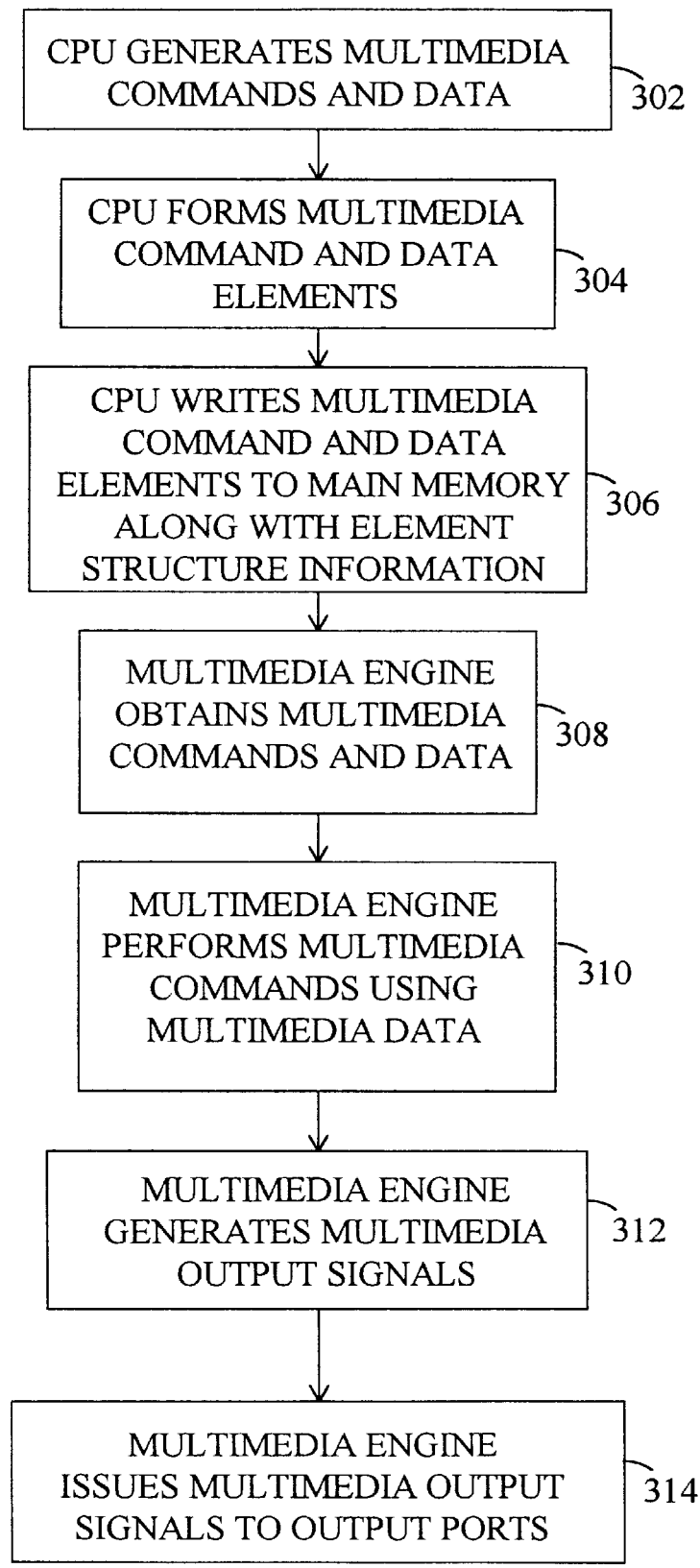
FIG. 5 is a flowchart of the method of performing real-time multimedia applications in the computer system of the present invention.

FIG. 5 is a flowchart of the method of performing real-time multimedia applications in a computer system including a dedicated multimedia engine 112 coupled to real-time data cache 126. During a first step 302, the CPU 102 generates multimedia commands and data. As it generates multimedia commands and data, the CPU 102 may advantageously access the real-time data cache containing data generated by an external source (i.e., a peripheral device connected to a local expansion bus or other expansion bus). The CPU may perform multimedia-related operations (e.g., image scaling or rotation) upon the multimedia data from real-time data cache 126, generating additional multimedia data. The CPU 102 forms separate multimedia command and data elements during step 304. The multimedia command element contains multimedia commands, and the multimedia data element contains multimedia data. During step 306, the CPU 102 writes the multimedia command and data elements to a multimedia address space in the main memory, along with element structure information.

The multimedia engine 112 obtains commands and data from the main memory 110 and/or the real-time data cache 126 during step 308. The element structure information provided by the CPU 102 is used when retrieving multimedia commands and data from the main memory. In embodiments in which the multimedia engine 112 is not coupled directly to the main memory 110, the real-time data cache 126 obtains multimedia commands and data from the main memory 110 through the chip set 106. The multimedia engine 112 may or may not prioritize the retrieved commands. During step 310, the multimedia engine 112 performs the multimedia commands using multimedia data. As the multimedia engine 112 performs the multimedia commands, the multimedia engine 112 may also obtain multimedia data from the real-time data cache 126 as needed. As a result of command execution, the multimedia engine 112 generates multimedia output signals during step 312. The multimedia engine 112 provides the multimedia output signals to appropriate output ports during step 314.

Conclusion

Therefore, the present invention comprises a novel computer system architecture which increases the performance of multimedia applications. A dedicated multimedia engine is coupled directly to a real-time data cache. The real-time data cache allows multimedia data from an external source (e.g., a video decoder or video capture device) to be stored in a location other than the main memory, and also allows this multimedia data to be shared by the CPU and the multimedia engine. The CPU may access data in the real-time data cache as it generates multimedia commands and data. The CPU writes multimedia commands and data to the main memory along with information about where commands and data are located in the main memory (i.e., element location information). The multimedia engine obtains commands and data from the main memory and/or the real-time data cache as needed. The real-time data cache reduces the access time for needed multimedia data as well as the loading on the main memory. Only the amount of main memory actually required by multimedia applications is allocated, thus freeing up as much of the main memory as possible for other applications.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

We claim:

1. A computer system, comprising:
    a CPU;
    an expansion bus coupled to the CPU, wherein the expansion bus is adapted for coupling to one or more peripheral devices;
    a peripheral device coupled to the expansion bus and configured to store multimedia data;
    a memory bus coupled to the CPU;
    a main memory coupled to the memory bus;
    chip set logic coupled to the CPU, the local expansion bus, and the memory bus;
    a multimedia engine coupled to the chip set logic and to the memory bus, wherein said multimedia engine includes one or more ports for connecting to a video monitor and to speakers; and
    a real-time data cache coupled between the multimedia engine and the chip set logic; wherein the chip set logic is configured to receive multimedia data from the peripheral device, and to provide said multimedia data to the real-time data cache;
    wherein the real-time data cache is configured to receive the multimedia data from the chip set, store said multimedia data, and to provide said multimedia data to the multimedia engine; and
    wherein the multimedia engine is configured to access said multimedia data from the real-time data cache.

2. The computer system as recited in claim 1, wherein the CPU is configured to generate multimedia commands and data and to provide said multimedia commands and data to the chip set logic, and wherein the chip set logic is configured to receive the multimedia commands and data from the CPU and to provide the multimedia commands and data to the main memory via the memory bus.

3. The computer system as recited in claim 1, wherein the multimedia engine is configured to receive multimedia commands and a first set of multimedia data from the main memory via the memory bus, and to receive a second set of multimedia data from the real-time data cache.

4. The computer system as recited in claim 2, wherein the chip set includes an arbitration logic unit configured to arbitrate between the CPU and the multimedia engine for access to the main memory via the memory bus.

5. The computer system as recited in claim 1, wherein the main memory comprises a memory address space, and a portion of said memory address space is allocated to the multimedia engine.

6. The computer system as recited in claim 1, wherein the multimedia engine comprises:
    a DSP engine coupled to receive multimedia commands and data, and configured to generate one or more multimedia output signals;
    an input/output channel coupled to the DSP engine; and
    an input/output port coupled to the input/output channel and configured to couple to an input/output device of the computer system; wherein the DSP engine is configured to provide the multimedia output signals to the input/output channel, the input/output channel is configured to receive the multimedia output signals from the DSP engine and to provide the multimedia output signals to the input/output port, and the input/output port is configured to receive the multimedia output signals from the input/output channel and to provide the multimedia output signals to the input/output device of the computer system.

7. The computer system as recited in claim 6, wherein the DSP engine is coupled to the memory bus and to the real-time data cache, and wherein the DSP engine is configured to receive first multimedia data from the main memory via the memory bus, and to receive second multimedia data from the real-time data cache.

8. The computer system as recited in claim 6, wherein the multimedia engine further comprises:
    a memory controller coupled to the memory bus and to the real-time data cache, wherein the memory controller is configured to receive first multimedia data from the main memory, and to receive second multimedia data from the real-time data cache; and
    a multimedia memory coupled between the memory controller and the DSP engine; wherein the memory controller is configured to provide the first and second multimedia data to the multimedia memory, and wherein the multimedia memory is configured to receive the first and second multimedia data from the memory controller, to store the first and second multimedia data, and to provide the first and second multimedia data to the DSP engine.

9. The computer system as recited in claim 6, further comprising:
    a DMA controller coupled to the memory bus and configured to receive multimedia commands and a first set of multimedia data from the main memory via the memory bus;

a memory controller coupled to the DMA controller and to the real-time data cache; and a multimedia memory coupled to the memory controller and to the DSP engine; wherein the DMA controller is configured to provide the multimedia commands and the first set of multimedia data to the memory controller, wherein the memory controller is configured to receive the multimedia commands and the first set of multimedia data from the DMA controller, to receive a second set of multimedia data from the real-time cache, and to provide the multimedia commands and the first and second sets of multimedia data to the multimedia memory, and wherein the multimedia memory is configured to receive the multimedia commands and the first and second sets of multimedia data from the memory controller, to store the multimedia commands and the first and second sets of multimedia data, and to provide the multimedia commands and the first and second sets of multimedia data to the DSP engine.

10. A computer system, comprising:

a CPU;

an expansion bus coupled to the CPU and configured to couple to a peripheral device;

a memory bus coupled to the CPU;

chip set logic coupled to the CPU, the expansion bus, and the memory;

main memory coupled to the memory bus;

a multimedia engine coupled to the memory bus, wherein said multimedia engine comprises:

a DSP engine coupled to receive multimedia commands and data, and configured to generate multimedia output data;

an input/output channel coupled to the DSP engine; and an input/output port coupled to the input/output channel and configured to couple an input/output device to the computer system; wherein the DSP engine is configured to provide the multimedia output data to the input/output channel, the input/output channel is configured to receive the multimedia output data from the DSP engine and to provide the multimedia output data to the input/output port, and the input/output port is configured to receive the multimedia output data from the input/output channel and to provide the multimedia output data to an input/output device coupled to the input/output port; and a real-time data cache coupled between the multimedia engine and the chip set logic; wherein the chip set logic is configured to receive multimedia data from a peripheral device coupled to the expansion bus and provide said multimedia data to the real-time data cache, and wherein the real-time data cache is coupled to receive the multimedia data from the chip set logic, store said multimedia data, and provide said multimedia data to the multimedia engine.

11. A computer system, comprising:

a CPU;

an expansion bus coupled to the CPU and configured to couple a peripheral device;

a memory bus coupled to the CPU;

main memory coupled to the memory bus;

chip set logic coupled to the CPU, the expansion bus, and the memory bus;

a multimedia engine for performing multimedia video and audio operations, wherein the multimedia engine comprises:

a DSP engine coupled to the real-time data cache, wherein the DSP engine is configured to receive multimedia commands and data from the real-time data cache and to generate multimedia output signals;

an input/output channel coupled to the DSP engine; and an input/output port coupled to the input/output channel and configured to couple to an input/output device to the computer system; wherein the DSP engine is configured to provide the multimedia output signals to the input/output channel, the input/output channel is configured to receive the multimedia output signals from the DSP engine and to provide the multimedia output signals to the input/output port, and the input/output port is configured to receive the multimedia output signals from the input/output channel and to provide the multimedia output signals to an input/output device coupled to the input/output port; and a real-time data cache coupled between the multimedia engine and the chip set logic; wherein the chip set logic is configured to receive multimedia data from a peripheral device coupled to the expansion bus and to provide said multimedia data to the real-time data cache, wherein the real-time data cache is configured to receive the multimedia data from the chip set logic, store said multimedia data, and to provide said multimedia data to the multimedia engine.

12. A computer system, comprising:

a CPU;

an expansion bus coupled to the CPU and configured to couple a peripheral device to the computer system;

a memory bus;

a main memory coupled to the memory bus;

chip set logic coupled to the CPU, the extension bus, and the memory bus;

a multimedia engine comprising:

a DSP engine configured to generate multimedia output signals;

an input/output channel coupled to the DSP engine; and an input/output port coupled to the input/output channel and configured to couple an input/output device to the computer system; wherein the DSP engine is configured to provide the multimedia output signals to the input/output channel, the input/output channel is configured to receive the multimedia output signals from the DSP engine and to provide the multimedia output signals to the input/output port, and the input/output port is configured to receive the multimedia output signals form the input/output channel and to provide the multimedia output signals to an input/output device coupled to the input/output port; and a real-time data cache coupled between the multimedia engine and the chip set logic; wherein the chip set logic is configured to receive multimedia commands and data from the main memory via the memory bus and to provide said multimedia commands and data to the real-time data cache, wherein the real-time data cache is configured to receive the multimedia commands and data from the chip set logic, store said multimedia commands and data, and to provide said multimedia commands and data to the DSP engine of the multimedia engine, and wherein the DSP engine is configured to receive multimedia commands and data from the real-time data cache.

13. A method of performing real-time multimedia applications in a computer system, wherein the computer comprises a CPU; a local expansion bus; a memory bus; a chip set logic coupled to the CPU, the local expansion bus, and the memory bus; a main memory coupled to the memory bus; a multimedia engine coupled to the memory bus, wherein the multimedia engine includes an input/output port; and a real-time data cache coupled between the multimedia engine and the chip set logic, the method comprising:

the CPU generating multimedia commands and data;

the CPU providing the multimedia commands and data to the main memory;

the multimedia engine concurrently obtaining multimedia commands from the main memory and multimedia data from the real-time data cache;

the multimedia engine performing the multimedia commands using the multimedia data;

the multimedia engine generating a multimedia output signal; and the multimedia engine providing the multimedia output signal to the input/output port.

14. The method as recited in claim 13, wherein the step of the CPU providing the multimedia commands to the main memory comprises:

the CPU generating multimedia command and data elements;

the CPU generating command and data element structure information; and the CPU providing the multimedia command and data elements and the command and data element structure information to the main memory.

15. The method as recited in claim 13, wherein the multimedia engine obtains multimedia data from the main memory and from the real-time data cache during the obtaining step.

16. The method as recited in claim 13, wherein the multimedia engine obtains multimedia commands and data from the real-time data cache during the obtaining step.

17. A computer system, comprising:

a CPU;

an expansion bus coupled to the CPU, wherein the expansion bus is adapted for coupling to one or more peripheral devices;

a peripheral device coupled to the expansion bus and configured to store multimedia data;

a memory bus coupled to the CPU;

a main memory coupled to the memory bus; chip set logic coupled to the CPU, the local expansion bus, and the memory bus;

a multimedia engine coupled to the chip set logic, wherein the multimedia engine comprises:

a DSP engine coupled to receive multimedia commands and data, and configured to generate one or more multimedia output signals, wherein the DSP engine is coupled to the memory bus and to the real-time data cache, and wherein the DSP engine is configured to receive first multimedia data from the main memory via the memory bus, and to receive second multimedia data from the real-time data cache;

an input/output channel coupled to the DSP engine; and one or more input/output ports coupled to the input/output channel and configured to couple to one or more input/output devices of the computer system;

wherein the DSP engine is configured to provide the multimedia output signals to the input/output channel, the input/output channel is configured to receive the multimedia output signals from the DSP engine and to provide the multimedia output signals to the one or more input/output ports, and the input/output ports are configured to receive the multimedia output signals from the input/output channel and to provide the multimedia output signals to the one or more input/output devices of the computer system, wherein the one or more input/output devices of the computer system include a video monitor and speakers; and a real-time data cache coupled between the multimedia engine and the chip set logic; wherein the chip set logic is configured to receive multimedia data from the peripheral device, and to provide said multimedia data to the real-time data cache;

wherein the real-time data cache is configured to receive the multimedia data from the chip set, store said multimedia data, and to provide said multimedia data to the multimedia engine; and wherein the multimedia engine is configured to access said multimedia data from the real-time data cache.

18. The computer system as recited in claim 17, wherein the multimedia engine further comprises:

a memory controller coupled to the memory bus and to the real-time data cache, wherein the memory controller is configured to receive first multimedia data from the main memory, and to receive second multimedia data from the real-time data cache; and a multimedia memory coupled between the memory controller and the DSP engine; wherein the memory controller is configured to provide the first and second multimedia data to the multimedia memory, and wherein the multimedia memory is configured to receive the first and second multimedia data from the memory controller, to store the first and second multimedia data, and to provide the first and second multimedia data to the DSP engine.

19. The computer system as recited in claim 17, further comprising:

a DMA controller coupled to the memory bus and configured to receive multimedia commands and a first set of multimedia data from the main memory via the memory bus;

a memory controller coupled to the DMA controller and to the real-time data cache; and a multimedia memory coupled to the memory controller and to the DSP engine; wherein the DMA controller is configured to provide the multimedia commands and the first set of multimedia data to the memory controller, wherein the memory controller is configured to receive the multimedia commands and the first set of multimedia data from the DMA controller, to receive a second set of multimedia data from the real-time cache, and to provide the multimedia commands and the first and second sets of multimedia data to the multimedia memory, and wherein the multimedia memory is configured to receive the multimedia commands and the first and second sets of multimedia data from the memory controller, to store the multimedia commands and the first and second sets of multimedia data, and to provide the multimedia commands and the first and second sets of multimedia data to the DSP engine.

* * * * *

UNITED STATES PATENT AND TRADEMARK OFFICE
CERTIFICATE OF CORRECTION

PATENT NO. : 5,898,892
DATED : April 27, 1999
INVENTOR(S) : Gulick, et. al.

It is certified that error appears in the above-identified patent and that said Letters Patent is hereby corrected as shown below:

Claim 11, col. 12, line 24, delete "cache," and substitute cache, and--.

Claim 12, col. 12, line 35, delete "extension" and substitute--expansion--.

Claim 12, col. 12, line 50, delete "form" and substitute --from--.

Signed and Sealed this

Twenty-fourth Day of August, 1999

Attest:

Attesting Officer

Q. TODD DICKINSON

Acting Commissioner of Patents and Trademarks